[12] United States Patent
Yang et al.

(10) Patent No.: US 11,483,092 B2
(45) Date of Patent: Oct. 25, 2022

(54) COLLISION HANDLING FOR PHYSICAL UPLINK SHARED CHANNEL (PUSCH) REPETITION

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 16/775,086

(22) Filed: Jan. 28, 2020

(65) Prior Publication Data

US 2020/0274639 A1 Aug. 27, 2020

Related U.S. Application Data

(60) Provisional application No. 62/810,817, filed on Feb. 26, 2019.

(51) Int. Cl.
*H04L 1/00* (2006.01)
*H04W 72/04* (2009.01)
*H04W 72/10* (2009.01)
*H04L 1/18* (2006.01)
(Continued)

(52) U.S. Cl.
CPC .......... *H04L 1/0026* (2013.01); *H04L 1/1819* (2013.01); *H04L 5/0055* (2013.01); *H04W 72/0413* (2013.01); *H04W 72/0446* (2013.01); *H04W 72/10* (2013.01); *H04W 72/1268* (2013.01)

(58) Field of Classification Search
None
See application file for complete search history.

(56) References Cited

U.S. PATENT DOCUMENTS

| | | | | |
|---|---|---|---|---|
| 2016/0226649 | A1* | 8/2016 | Papasakellariou | .... H04L 1/0001 |
| 2018/0167933 | A1* | 6/2018 | Yin | ........................ H04L 5/0051 |
| 2019/0261391 | A1* | 8/2019 | Kundu | .............. H04W 72/0446 |

(Continued)

OTHER PUBLICATIONS

Catt, "Corrections to UCI feedback", Feb. 16, 2019, 3GPP TSG RAN WG1 Meeting #96, pp. 1-11 (Year: 2019).*

(Continued)

*Primary Examiner* — Steve R Young
(74) *Attorney, Agent, or Firm* — Harrity & Harrity LLP

(57) ABSTRACT

Various aspects of the present disclosure generally relate to wireless communication. In some aspects, a user equipment (UE) may identify one or more slots in which an aperiodic channel state information (A-CSI) report communication on a multi-slot physical uplink shared channel (PUSCH) overlaps with a second communication on a physical uplink control channel (PUCCH). The UE may select for a slot of the one or more slots, an uplink communication from the A-CSI report communication or the second communication based at least in part on a first priority assigned to the A-CSI report communication and a second priority assigned to the second communication. The UE may determine whether to transmit the uplink communication on the multi-slot PUSCH or the PUCCH in the slot. The UE may transmit the uplink communication in the slot. Numerous other aspects are provided.

30 Claims, 8 Drawing Sheets

(51) Int. Cl.
  *H04W 72/12* (2009.01)
  *H04L 5/00* (2006.01)

(56) References Cited

U.S. PATENT DOCUMENTS

2019/0306922 A1* 10/2019 Xiong .................. H04L 1/1664
2019/0327759 A1* 10/2019 Lee .................... H04W 72/1284
2020/0145167 A1* 5/2020 Jung ................... H04L 5/0007
2021/0226683 A1* 7/2021 Yoshioka .......... H04W 72/0413

OTHER PUBLICATIONS

Huawei, HiSilicon, "Discussion on partial overlap between PUCCH and PUCCH/PUSCH", May 21-25, 2018, 3GPP TSG RAN WG1 Meeting #93, pp. 1-9 (Year: 2018).*

"3rd Generation Partnership Project, Technical Specification Group Radio Access Network, NR, Physical layer procedures for control (Release 15)", 3GPP Standard, Technical Specification, 3GPP TS 38.213, 3rd Generation Partnership Project (3GPP), Mobile Competence Centre, 650, Route Des Lucioles, F-06921 Sophia-Antipolis Cedex, France, vol. RAN WG1, No. V15.4.0, 2018, pp. 1-104, XP051591795, [retrieved on Jan. 16, 2019] section 9; p. 37-p. 38 section 9.2; p. 51-p. 67.

CATT: "Corrections to UCI Feedback", 3GPP Draft, 3GPP TSG RAN WG1 Meeting #96, R1-1901978, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599672, 11 pages, Retrieved from the Internet: URL: http://www.3gpp.org/ftp/tsg%5Fran/WG1%5FRL1/TSGR1%5F96/Docs/R1%2D1901978%2Ezp. [retrieved on Feb. 16, 2019] section 2.1.1; p. 1 section 2.1.1; p. 2—figure 1, section 2 .1., Section 2.1.3; p. 3, Section 2.3; p. 7, Figure 2.

Huawei., et al., "Discussion on Partial Overlap Between PUCCH ano PUCCH/PUSCH", 3GPP Draft, 3GPP TSG RAN WG1 Meeting #93, R1-1806882, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442082, 9 pages, Retrieved from the Internet: URL: http://www.3gpp.org/ftp/Meetings%5F3GPP%5FSYNC/RAN1/Docs/. [retrieved on May 20, 2018] section 1; p. 1 section 2.1; p. 2; figure 1 section 3.1, p. 5-p. 6; Figures 6-7, Section 3.3; p. 6-7; Figure 9, Table under "Agreements in RAN1 Meeting #92bis"; p. 9.

International Search Report and Written Opinion—PCT/US2020/015663—ISA/EPO—dated Jul. 21, 2020.

Panasonic: "Discussion on UCT and PUCCH Enhancement tor URLLC", 3GPP Draft, 3GPP TSG RAN WG1 Ad-Hoc Meeting 1901, R1-1900400, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593314, 8 pages, Retrieved from the Internet: URL: http://www.3gpp.org/ftp/Meetings%5F3GPP%5FSYNC/RAN1/Docs/R1%2D1900400%2Ezip. [retrieved on Jan. 20, 2019] last paragraph +, proposal 3; p. 2 section 4; p. 6.

Qualcomm Incorporated: "Summary or Remaining Issues for Overlapping UL Transmissions", 3GPP Draft; R1-1807820 Summary of Remaining Issues for Overlapping UL Transmissions Version 7, 3rd Generation Partnership Project (3GPP), Mobile Competence Centre, 650, Route Des Lucioles, F-06921 Sophia-Antipolis Cedex, France, vol. RAN WG1, No. 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018 May 24, 2018 (May 24, 2018), XP05463428, Retrieved from the Internet: URL: http://www.3gpp.org/ftp/tsg%5Fran/WG1%5FRL1/TSGR1%5F93/Docs [retrieved on May 24, 2018] Proposal 5; p. 5 section "Overlapped multi-slot PUCCH/PUSCH"; p. 10-p. 11.

* cited by examiner

COLLISION HANDLING FOR PHYSICAL UPLINK SHARED CHANNEL (PUSCH) REPETITION

CROSS-REFERENCE TO RELATED APPLICATION

This application claims priority to U.S. Provisional Patent Application No. 62/810,817, filed on Feb. 26, 2019, entitled "COLLISION HANDLING FOR PHYSICAL UPLINK SHARED CHANNEL (PUSCH) REPETITION," which is hereby expressly incorporated by reference herein.

FIELD OF THE DISCLOSURE

Aspects of the present disclosure generally relate to wireless communication, and to techniques and apparatuses for collision handling for physical uplink shared channel (PUSCH) repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include identifying one or more slots in which an aperiodic channel state information (A-CSI) report communication on a multi-slot physical uplink shared channel (PUSCH) overlaps with a second communication on a physical uplink control channel (PUCCH); selecting, for a slot of the one or more slots, an uplink communication from the A-CSI report communication or the second communication based at least in part on a first priority assigned to the A-CSI report communication and a second priority assigned to the second communication; determining whether to transmit the uplink communication on the multi-slot PUSCH or the PUCCH in the slot; and transmitting, in the slot, the uplink communication based at least in part on determining whether to transmit the uplink communication on the multi-slot PUSCH or the PUCCH in the slot.

In some aspects, a UE for wireless communication may include memory and one or more processors operatively coupled to the memory. The memory and the one or more processors may be configured to identify one or more slots in which an A-CSI report communication on a multi-slot PUSCH overlaps with a second communication on a PUCCH; select, for a slot of the one or more slots, an uplink communication from the A-CSI report communication or the second communication based at least in part on a first priority assigned to the A-CSI report communication and a second priority assigned to the second communication; determine whether to transmit the uplink communication on the multi-slot PUSCH or the PUCCH in the slot; and transmit, in the slot, the uplink communication based at least in part on determining whether to transmit the uplink communication on the multi-slot PUSCH or the PUCCH in the slot.

In some aspects, a non-transitory computer-readable medium may store one or more instructions for wireless communication. The one or more instructions, when executed by one or more processors of a UE, may cause the one or more processors to identify one or more slots in which an A-CSI report communication on a multi-slot PUSCH overlaps with a second communication on a PUCCH; select, for a slot of the one or more slots, an uplink communication from the A-CSI report communication or the second communication based at least in part on a first priority assigned to the A-CSI report communication and a second priority assigned to the second communication; determine whether to transmit the uplink communication on the multi-slot PUSCH or the PUCCH in the slot; and transmit, in the slot, the uplink communication based at least in part on determining whether to transmit the uplink communication on the multi-slot PUSCH or the PUCCH in the slot.

In some aspects, an apparatus for wireless communication may include means for identifying one or more slots in which an A-CSI report communication on a multi-slot PUSCH overlaps with a second communication on a PUCCH; means for selecting, for a slot of the one or more slots, an uplink communication from the A-CSI report communication or the second communication based at least in part on a first priority assigned to the A-CSI report communication and a second priority assigned to the second communication; means for determining whether to transmit the uplink communication on the multi-slot PUSCH or the PUCCH in the slot; and means for transmitting, in the slot, the uplink communication based at least in part on determining whether to transmit the uplink communication on the multi-slot PUSCH or the PUCCH in the slot.

Aspects generally include a method, apparatus, system, computer program product, non-transitory computer-readable medium, user equipment, base station, wireless communication device, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
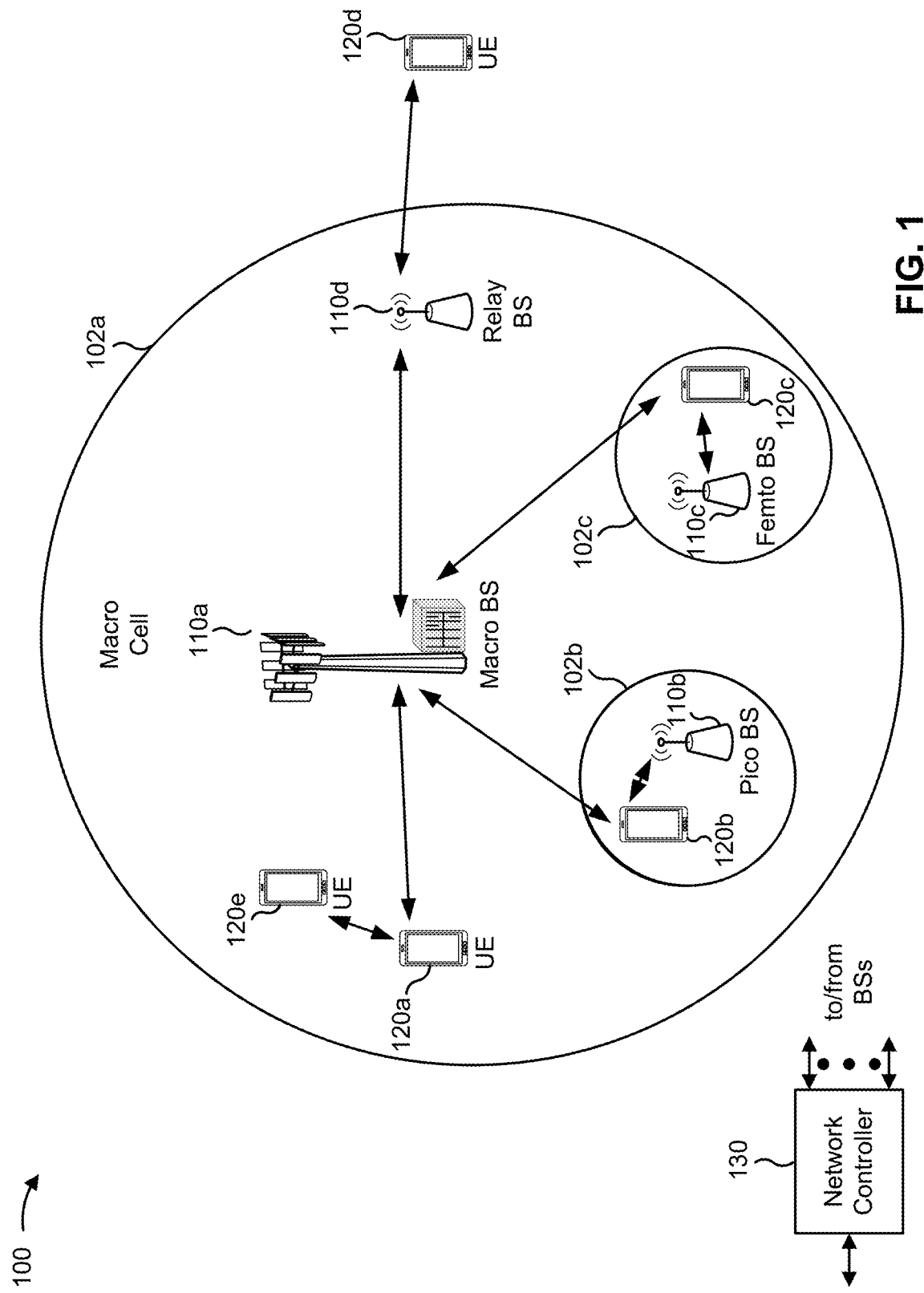
FIG. 1 is a block diagram conceptually illustrating an example of a wireless communication network, in accordance with various aspects of the present disclosure.

In some communications systems, such as 5G or NR, a user equipment (UE) may transmit a communication to a base station (BS) on a physical uplink channel (e.g., a physical uplink control channel (PUCCH), a physical uplink shared channel (PUSCH), and/or the like) in one or more slots. In some cases, a plurality of communications may be scheduled (e.g., by the BS, by the UE, by another entity in the communications system, and/or the like) to be transmitted by the UE in the same slot, which may be referred to as a collision. In some cases, the UE may be configured to apply a complex set of rules to resolve the collision. However, the UE may be unable to resolve a collision between a first communication that is scheduled to be transmitted with repetition on a multi-slot PUSCH and a second communication that is scheduled to be transmitted on a PUCCH.

Some aspects described herein provide techniques and apparatuses for collision handling for PUSCH repetition. In some aspects, a UE may identify one or more slots in which an aperiodic channel state information (A-CSI) report communication on a multi-slot PUSCH (e.g., a communication to be transmitted in a plurality of time slots on the multi-slot PUSCH with repetition, which may also be referred to as slot aggregation) overlaps with a second communication on a PUCCH. The UE may select, for a slot of the one or more slots, an uplink communication, to be transmitted in the slot, from the A-CSI report communication or the second communication based at least in part on a first priority assigned to the A-CSI report communication and a second priority assigned to the second communication. The UE may determine to drop and/or refrain from transmitting the non-selected communication of the A-CSI report communication or the second communication. The UE may determine on which physical uplink channel to transmit the uplink communication in the slot and may transmit the uplink communication on the determined physical uplink channel in the slot.

In this way, the UE is capable of resolving a collision between an A-CSI report communication that is scheduled to be transmitted with repetition (which may also be referred to as slot aggregation) on a multi-slot PUSCH and a second communication that is scheduled to be transmitted on a PUCCH (e.g., a single-slot PUCCH, a multi-slot PUCCH, and/or the like), which increases the reliability of the UE, increases the operability of the UE, increases the ability of the UE to resolve collisions, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In some aspects a UE 120 may be configured to communicate with a BS 110. For example, the UE 120 may be configured to communicate with the BS 110 on a downlink and/or an uplink of a wireless communication link. BS 110 may transmit a physical downlink shared channel (PDSCH) communication to UE 120 on the downlink, and UE 120 may transmit various uplink communications on the uplink. The various uplink communications may include an A-CSI report communication (e.g., a communication that includes channel state information (CSI) feedback based at least in part on a CSI reference signal transmitted from BS 110, and that is transmitted to BS 110 aperiodically), a periodic CSI (P-CSI) report communication, a semi-persistent CSI (SP-CSI) report communication, a scheduling request (SR) communication (e.g., a communication that requests uplink radio resources to be scheduled for the transmission of data on the uplink), a hybrid automatic repeat request (HARQ) communication (e.g., an HARQ acknowledgement (HARQ-Ack), an HARQ negative acknowledgement (HARQ-Nack), and/or the like), and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
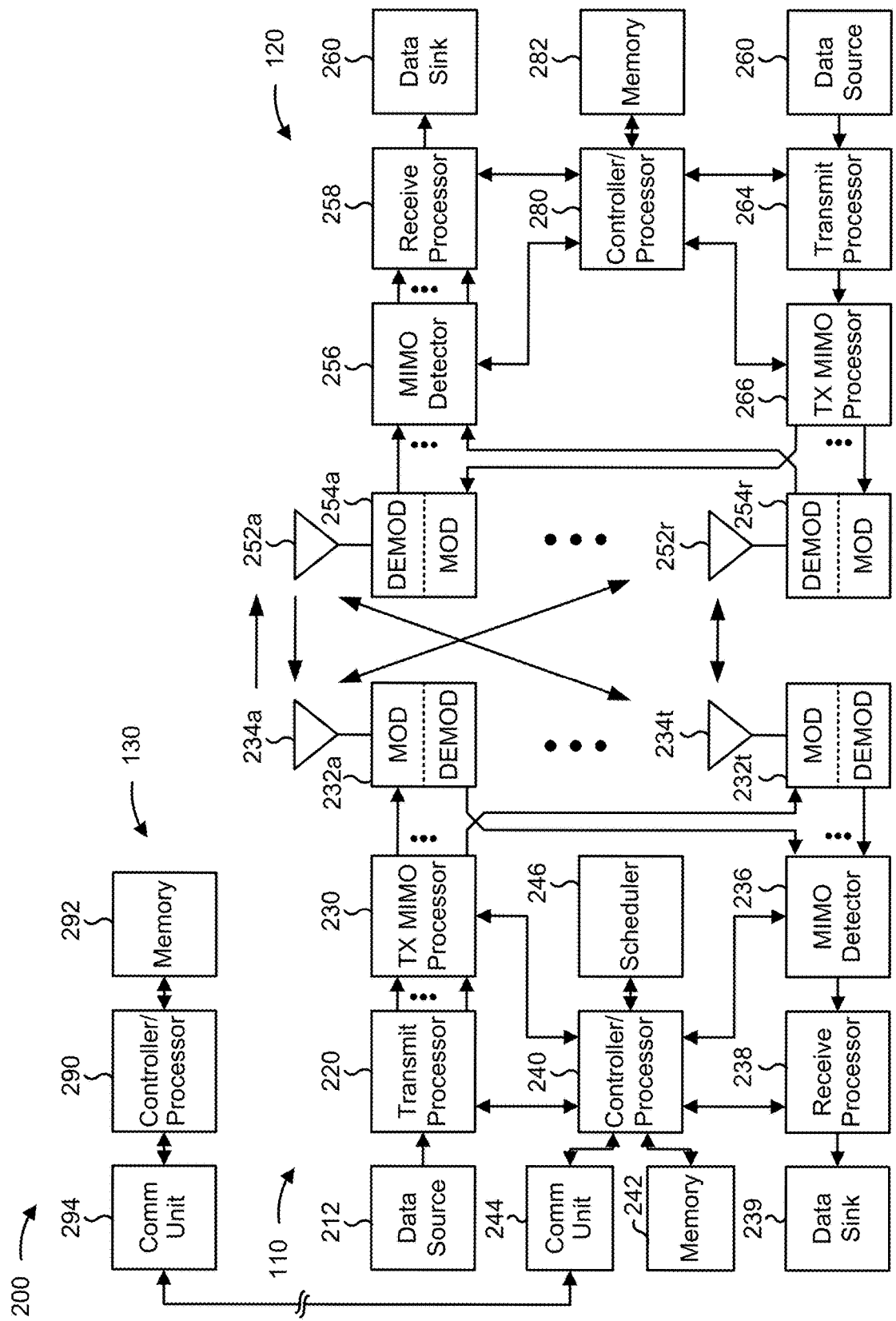
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244.

Network controller 130 may include communication unit 294, controller/processor 290, and memory 292.

Controller/processor 240 of base station 110, controller/processor 280 of UE 120, and/or any other component(s) of FIG. 2 may perform one or more techniques associated with collision handling for PUSCH repetition, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

Figure 6:
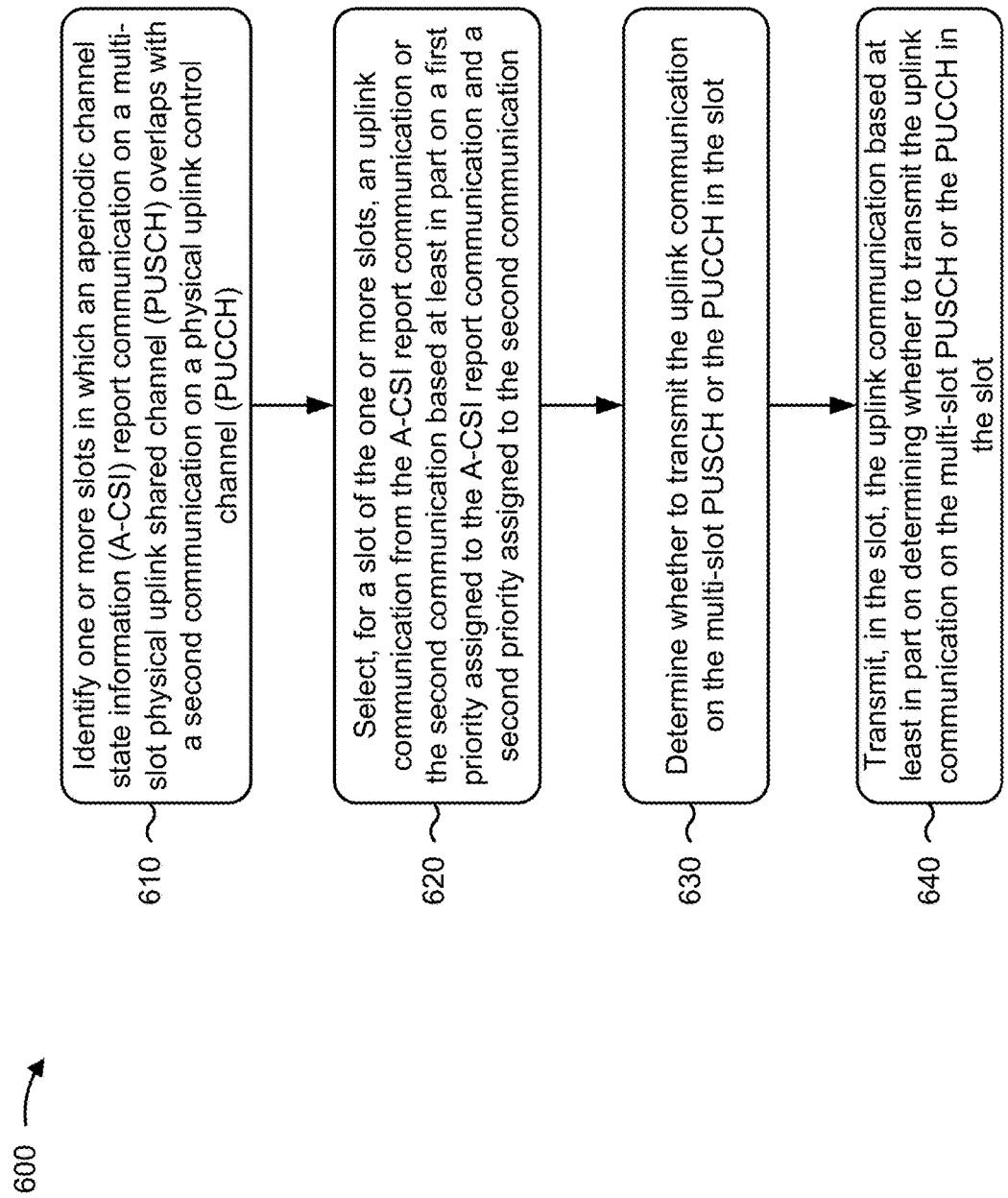
FIG. 6 is a diagram illustrating an example process performed, for example, by a user equipment (UE), in accordance with various aspects of the present disclosure.

The stored program codes, when executed by processor 280 and/or other processors and modules at UE 120, may cause the UE 120 to perform operations described with respect to process 600 of FIG. 6 and/or other processes as described herein. A scheduler 246 may schedule UEs for data transmission on the downlink and/or uplink.

In some aspects, UE 120 may include means for identifying one or more slots in which an A-CSI report communication on a multi-slot PUSCH overlaps with a second communication on a PUCCH, means for selecting, for a slot of the one or more slots, an uplink communication from the A-CSI report communication or the second communication based at least in part on a first priority assigned to the A-CSI report communication and a second priority assigned to the second communication, means for determining whether to transmit the uplink communication on the multi-slot PUSCH or the PUCCH in the slot, means for transmitting, in the slot, the uplink communication based at least in part on determining whether to transmit the uplink communication on the multi-slot PUSCH or the PUCCH in the slot, and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
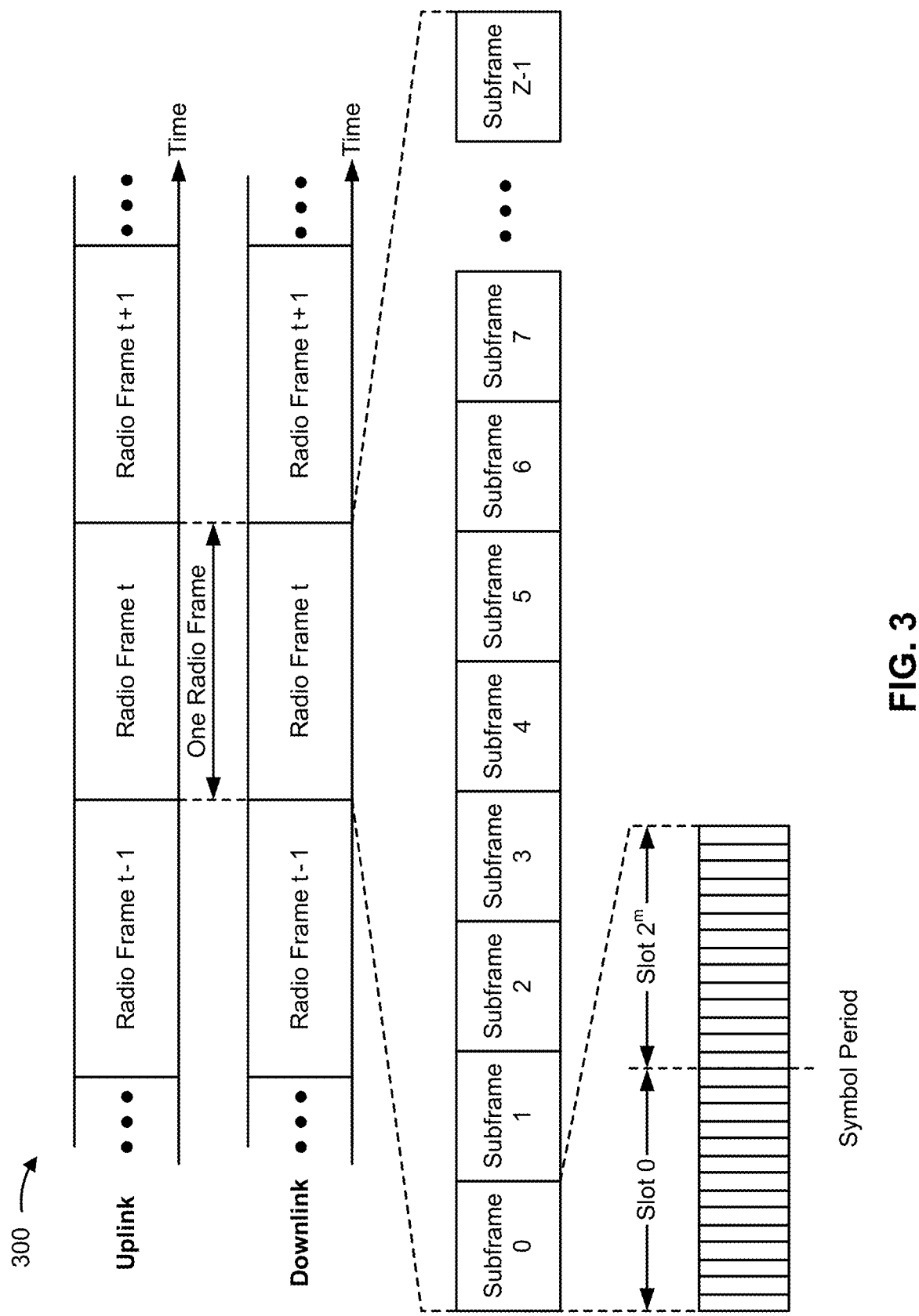
FIG. 3 is a block diagram conceptually illustrating an example of a frame structure in a wireless communication network, in accordance with various aspects of the present disclosure.

FIG. 3 illustrates an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

In some aspects, a base station (e.g., BS 110) may schedule one or more physical uplink channels for one or more slots in the uplink. A user equipment (e.g., UE 120) may use the one or more physical channels to transmit uplink communications to BS 110. The one or more physical uplink channels may include a physical uplink shared channel (PUSCH), a physical uplink control channel (PUCCH), and/or the like. In some aspects, a physical uplink channel may be a single-slot physical uplink channel in that the physical uplink channel is scheduled for a single slot in the uplink. In some aspects, a physical uplink channel may be a multi-slot physical uplink channel in that the physical uplink channel is scheduled for multiple contiguous slots in the uplink. In some aspects, a UE 120 may transmit an uplink communication on a multi-slot physical uplink channel with repetition (e.g., may transmit the uplink communication in each slot in which the multi-slot physical uplink channel is scheduled, which may also be referred to as slot aggregation).

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

As indicated above, FIG. 3 is provided as an example. Other examples may differ from what is described with regard to FIG. 3.

Figure 4:
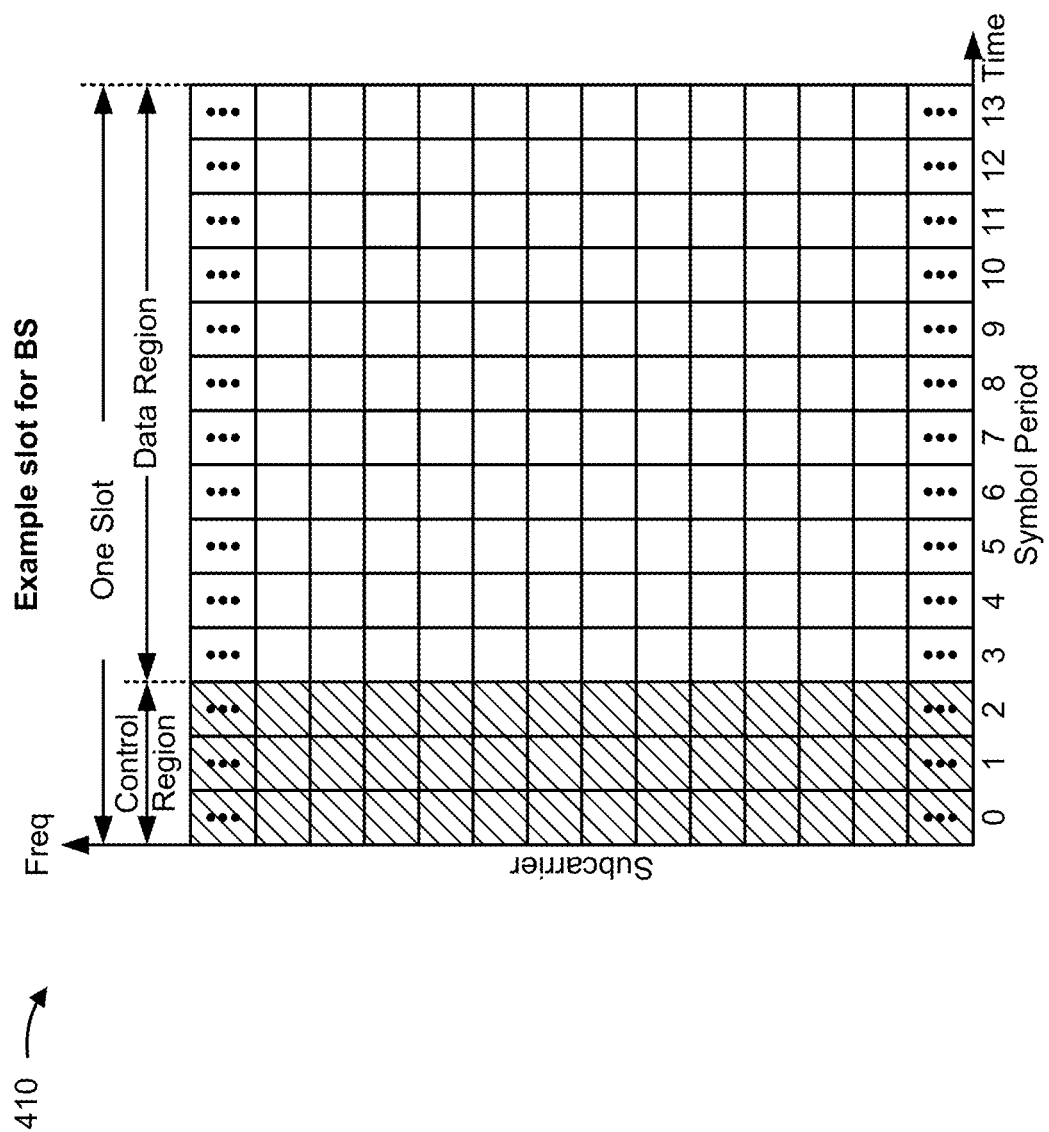
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

In some aspects, a base station (e.g., BS 110) may configure and/or schedule one or more symbols, included in a slot, to be used by a user equipment (e.g., UE 120) for transmission of an uplink communication. For example, BS 110 may configure and/or schedule one or more symbols, half-symbols, and/or other portions of symbols as a PUSCH or a PUCCH that may be used for the transmission of various types of uplink communications.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving B S may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5A:
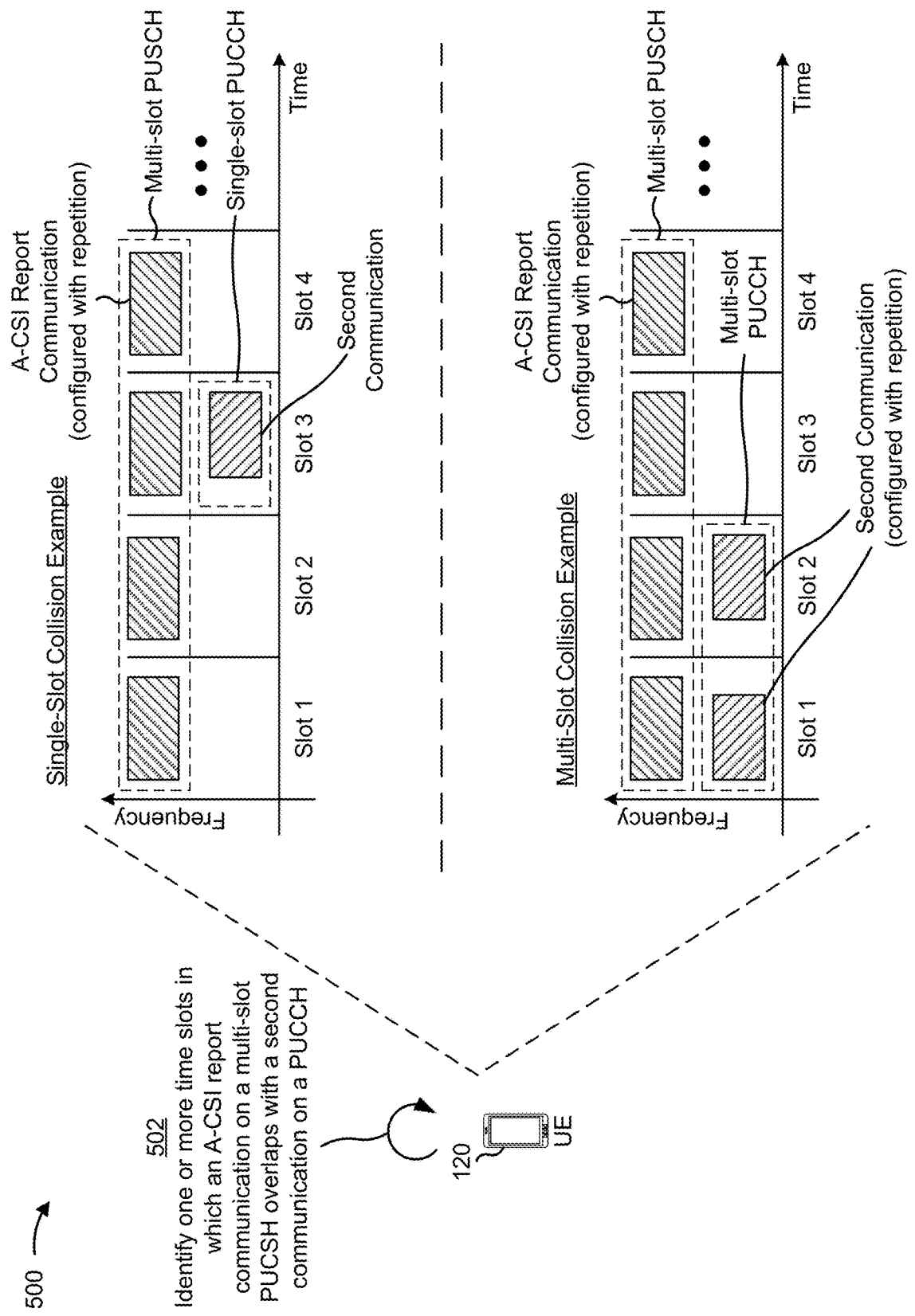
FIGS. 5A-5C are diagrams illustrating an example of collision handling for physical uplink shared channel (PUSCH) repetition, in accordance with various aspects of the present disclosure.
Figure 5B:
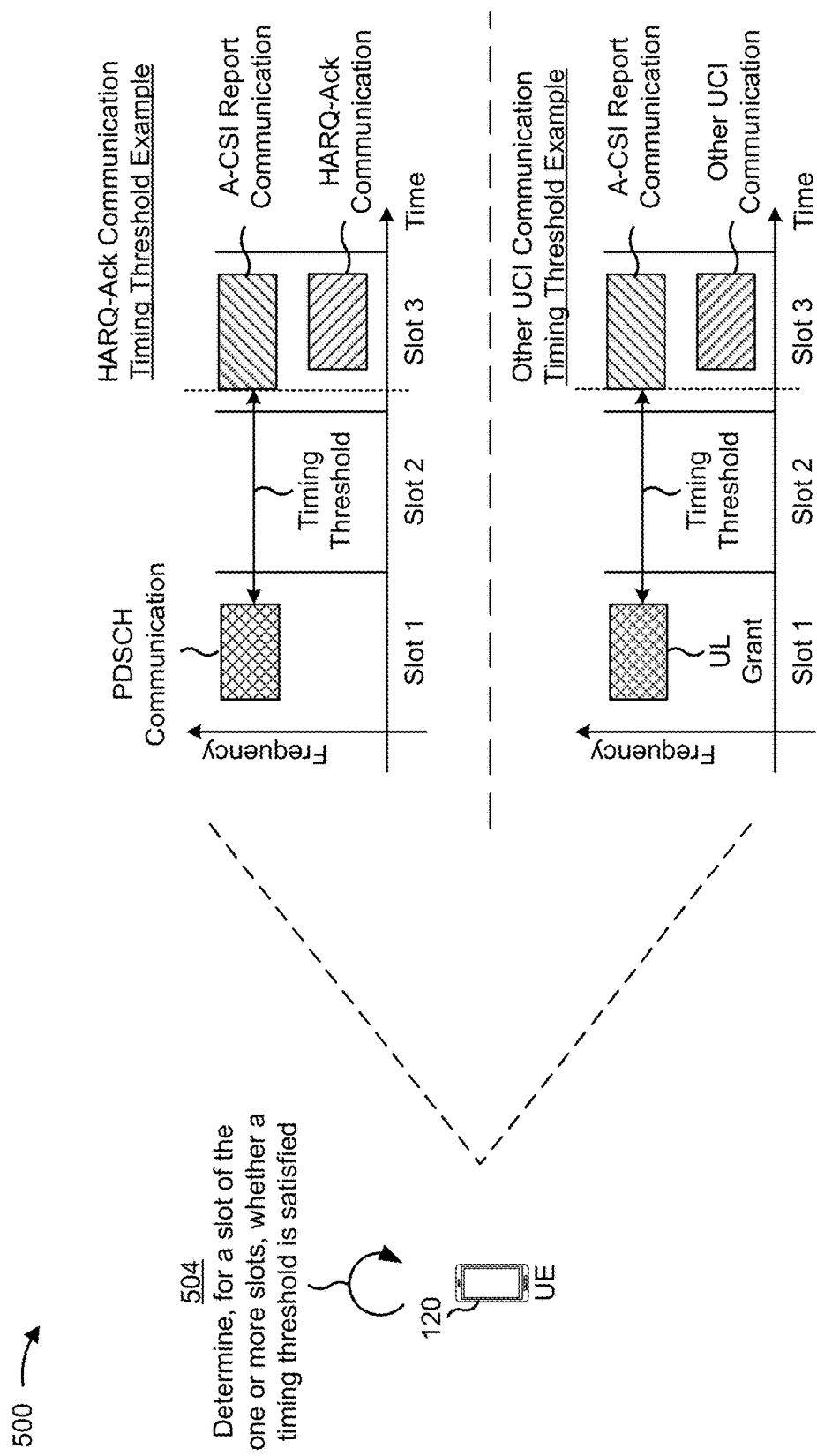
Figure 5C:
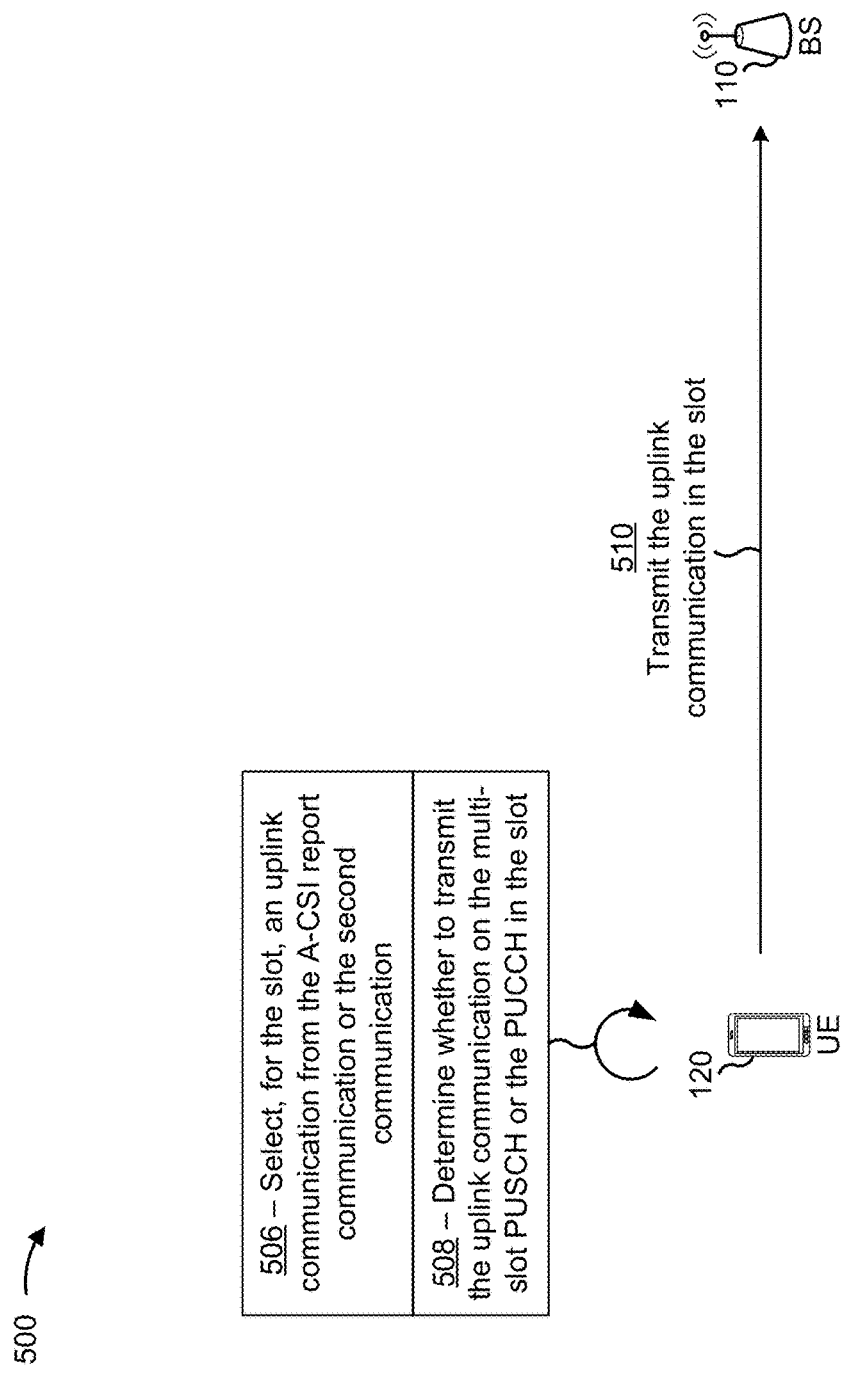

FIG. 5A-5C are diagrams illustrating an example 500 of collision handling for PUSCH repetition, in accordance with various aspects of the present disclosure. As shown in FIGS. 5A-5C, example 500 includes a base station (e.g., BS 110) and a user equipment (e.g., UE 120). In some aspects, BS 110 and UE 120 may be included in a wireless network and may be configured to communicate on a downlink and/or an uplink of a wireless communication link between BS 110 and UE 120.

UE 120 may transmit the communications on one or more physical uplink channels, such as a physical uplink control channel (PUCCH), a physical uplink shared channel (PUSCH), and/or the like. In some aspects, UE 120 may transmit a communication at a particular frequency and in one or more time slots. A physical uplink channel that is configured to transmit a communication with repetition (e.g., the communication is to be transmitted in a plurality of time slots on the physical uplink channel, which may also be referred to as slot aggregation) may be referred to as a multi-slot physical uplink channel, and a physical uplink channel that is configured to transmit a communication without repetition may be referred to as a single-slot physical uplink channel.

In some aspects, UE 120 may receive an uplink (UL) grant (e.g., from BS 110, from another entity in the communications system, and/or the like) for transmitting an A-CSI report communication on a PUSCH to BS 110, and may generate the A-CSI report communication based on receiving the UL grant. In some aspects, the PUSCH may include a multi-slot PUSCH (e.g., a PUSCH that is scheduled for a plurality of contiguous slots of the uplink, such as Slot 1 through Slot 4 in the example illustrated in FIG. 5A). The UL grant may schedule the A-CSI report communication to be transmitted with repetition on the multi-slot PUSCH. In this case, UE 120 may transmit the A-CSI report communication in each slot in which the multi-slot PUSCH is configured.

In some cases, the UL grant for the A-CSI report communication may result in a collision in one or more slots of the uplink. For example, and as illustrated in FIG. 5A, UE 120 may be scheduled to transmit the A-CSI report communication on the multi-slot PUSCH, and a second communication on a PUCCH, in Slot 3 of the uplink. In this case, and as shown by reference number 502, UE 120 may identify the one or more slots in which the A-CSI report communication on the multi-slot PUSCH overlaps with (and thus collides with) the second communication on the PUCCH.

In some aspects, UE 120 may determine that the A-CSI report communication and the second communication overlap (and thus collide) if the A-CSI report communication and the second communication are scheduled to be transmitted in the same. In some aspects, UE 120 may determine that the A-CSI report communication and the second communication overlap (and thus collide) if the A-CSI report communication and the second communication are scheduled to be transmitted in the same slot and the transmission of the A-CSI report communication and the transmission of the second communication in the slot overlap by at least one OFDM symbol in the slot.

In some aspects, the collision may be a single-slot collision, an example of which is illustrated in FIG. 5A. In this case, the A-CSI report communication on the multi-slot PUSCH overlaps with the second communication on a single-slot PUCCH in one slot (e.g., Slot 3 in the single-slot collision example illustrated in FIG. 5A). In some aspects, the collision may be a multi-slot collision, an example of which is illustrated in FIG. 5A. In this case, the A-CSI report communication on the multi-slot PUSCH overlaps with the second communication on a multi-slot PUCCH in a plurality of slots (e.g., Slot 1 and Slot 2 in the multi-slot collision example illustrated in FIG. 5A).

In some aspects, the sub-carrier spacing of the multi-slot PUSCH may be the same relative to the sub-carrier spacing of the PUCCH. As an example, and as is illustrated in FIG. 5A, each slot of the multi-slot PUSCH may be the same or similar length as the PUCCH. In this case, the one or more slots, identified by UE 120, may be the same for the multi-slot PUSCH and the PUCCH. In some aspects, the sub-carrier spacing of the multi-slot PUSCH may be greater relative to the sub-carrier spacing of the PUCCH. As an example, the second communication illustrated on the PUCCH in FIG. 5A may span two slots (e.g., Slot 2 and Slot 3) of the multi-slot PUSCH (and thus, two A-CSI report communications). In this case, the one or more slots, identified by UE 120, may include a greater quantity of slots for the multi-slot PUSCH relative to the PUCCH. For example, if the PUCCH spans two slots of the multi-slot PUSCH, UE 120 may identify the two slots for the multi-slot PUSCH and the one slot for the PUCCH as the one or more slots.

As shown in FIG. 5B, and by reference number 504, UE 120 may determine, for a slot of the one or more slots, whether a timing threshold is satisfied. The timing threshold may include a quantity of symbols, half symbols, portions of symbols, and/or the like. In some aspects, UE 120 may be configured with information identifying the timing threshold by signaling (e.g., information identifying the timing threshold may transmitted to UE 120 in a signaling communication from BS 110 and/or another device included in the wireless network), when UE 120 is deployed in the wireless network, and/or the like. The signaling communication may include a radio resource control (RRC) communication, a medium access control control element (MAC-CE) communication, a downlink control information (DCI) communication, and/or the like. The information identifying the timing threshold may be included in a data structure, such as a table, an electronic file, a database, a specification, and/or the like. In this case, UE 120 may perform a look-up in the data structure to identify the information identifying the timing threshold. In some aspects, the information identifying the timing threshold may be stored in a memory device, may be hard-coded into an application-specific processor, and/or the like.

The timing threshold may be based at least in part on a communication type of the second communication. For example, if the second communication includes a hybrid automatic repeat request acknowledgement (HARQ-Ack) communication, the quantity of symbols, half symbols, portions of symbols, and/or the like included in the timing threshold may be based at least in part on a physical downlink shared channel (PDSCH) communication, transmitted from BS 110, and the communications that are scheduled to be transmitted by UE 120 in the slot. UE 120 may determine whether the timing threshold is satisfied based at least in part on determining whether an amount of time (in symbols, half symbols, portions of symbols, and/or the like), between a last symbol of the PDSCH communication and a first symbol of the earlier of a first symbol of the A-CSI report communication or a first symbol of the HARQ-Ack communication in the slot, satisfies the timing threshold.

As another example, if the second communication includes another type of uplink control information (UCI) communication, the quantity of symbols, half symbols, portions of symbols, and/or the like, included in the timing threshold, may be based at least in part on the UL grant and the communications that are scheduled to be transmitted by UE 120 in the slot. Other types of UCI communications may include a persistent channel state information (P-CSI) report communication, a semi-persistent channel state information (SP-CSI) report communication, a scheduling request (SR) communication, and/or the like. UE 120 may determine whether the timing threshold is satisfied based at least in part on determining whether an amount of time (in symbols, half symbols, portions of symbols, and/or the like), between a last symbol of the UL grant and a first symbol of the earlier of a first symbol of the A-CSI report communication or a first symbol of the HARQ-Ack communication in the slot, satisfies the timing threshold.

In some aspects, if UE 120 determines that the timing threshold is not satisfied, UE 120 may determine that a scheduling error has occurred. Accordingly, UE 120 may resolve the collision between the A-CSI report communication and the second communication based at least in part on a UE-specific operation, which may be different for different UE and/or component part vendors.

As shown in FIG. 5C, and by reference number 506, if UE 120 determines that the timing threshold is satisfied, UE 120 may select, for the slot, an uplink communication that is to be transmitted in the slot. UE 120 may select the uplink communication from the A-CSI report communication or the second communication, and may determine to drop (or refrain from transmitting) the non-selected communication in the slot in order to resolve the collision between the A-CSI report communication or the second communication.

In some aspects, UE 120 may resolve the collision based at least in part on respective priorities assigned to the A-CSI report communication and the second communication. UE 120 may be configured with information identifying the priorities by signaling to UE 120 (e.g., in a signaling communication transmitted from BS 110 and/or another device included in the wireless network), by being configured with the information identifying the priorities when UE 120 is deployed into the wireless network, and/or the like. The signaling communication may include an RRC communication, a MAC-CE communication, a DCI communication, and/or the like. The information identifying the priorities may be included in a data structure, such as a table, an electronic file, a database, a specification, and/or the like. In this case, UE 120 may perform a look-up in the data structure to identify the information identifying the priorities. In some aspects, the information identifying the priorities may be stored in a memory device, may be hard-coded into an application-specific processor, and/or the like.

In some aspects, an example priority hierarchy for the A-CSI report communication and different types of second communications may include an HARQ-Ack communication being assigned a greatest priority, an SR communication being assigned the next greatest priority relative to the priority of the HARQ-Ack communication, an A-CSI report communication being assigned the next greatest priority relative to the priority of the SR communication, and a P-CSI report communication or SP-CSI report communication being assigned the next greatest priority relative to the priority of the A-CSI report communication. However, other priority hierarchies and/or configurations may be used.

Using the priority hierarchy described above, if the second communication includes an HARQ-Ack communication, UE 120 may select the HARQ-Ack communication as the uplink communication to be transmitted in the slot and may drop (or refrain from transmitting) the A-CSI report communication (which may be a multi-slot A-CSI report communication) in the slot. This differs from the scenario where the A-CSI report communication is a single-slot A-CSI report communication, where the UE may multiplex the A-CSI report and the HARQ-Ack on the PUSCH. The UE may drop the A-CSI report communication in a multi-slot A-CSI report communication scenario because, if the UE attempts to multiplex the A-CSI and HARQ-ACK in the overlapping slot(s), the UE will not be able to combine the information decoded from the overlapping slot(s) for the A-CSI with the information decoded from the non-overlapping slot(s) for the A-CSI. As such, with high probability, the information transmitted in the overlapping slot(s) for the A-CSI will be lost. Therefore, the UE may refrain from transmitting the A-CSI in the overlapping slot(s). Instead, UE may transmit the HARQ-ACK only to ensure that the HARQ-ACK (which has higher priority) may be delivered correctly to the BS 110.

If the second communication includes a P-CSI report communication or a SP-CSI report communication, UE 120 may select the A-CSI report communication as the uplink communication to be transmitted in the slot and may drop (or refrain from transmitting) the P-CSI report communication or the SP-CSI report communication in the slot. If the second communication includes an SR communication, UE 120 may select the SR communication as the uplink communication to be transmitted in the slot and drop (or refrain from transmitting) the A-CSI report communication in the slot.

In some aspects, UE 120 may apply other and/or additional rules to select the uplink communication from A-CSI report communication or the second communication. For example, if the second communication includes an SR communication, UE 120 may select the uplink communication based at least in part on whether uplink data is scheduled to be transmitted along with the A-CSI report communication on the multi-slot PUSCH in the slot. In this case, UE 120 may select the A-CSI report communication as the uplink communication to be transmitted in the slot based at least in part on determining that uplink data is scheduled to be transmitted along with the A-CSI report communication on the multi-slot PUSCH in the slot. In this way, if the uplink data is already scheduled to be transmitted along with the A-CSI report communication on the multi-slot PUSCH in the slot, UE 120 may determine that the SR communication is not needed and accordingly may drop (or refrain from transmitting) the SR communication in the slot. On the other hand, UE 120 may select the SR communication as the uplink communication to be transmitted in the slot based at least in part on determining that no uplink data is scheduled to be transmitted along with the A-CSI report communication on the multi-slot PUSCH in the slot. In this way, if UE 120 has uplink data to transmit, UE 120 may determine that the SR communication may be needed in order to request the scheduling of uplink radio resources for the transmission of the uplink data.

As another example, if UE 120 determines that the PUCCH is a multi-slot PUCCH and that the second communication is scheduled to be transmitted on the multi-slot PUCCH with repetition (and thus, the collision is a multi-slot collision), UE 120 may select the uplink communication based at least in part on respective starting slots of the multi-slot PUSCH and the multi-slot PUCCH. In this case, UE 120 may select the uplink communication based at least in part on which of the starting slots occurs earlier in time. If the starting slot of the multi-slot PUSCH occurs earlier in time relative to the starting slot of the multi-slot PUCCH, UE 120 may select the A-CSI report communication as the uplink communication to be transmitted, and may drop (or refrain from transmitting) the second communication, in each overlapping slot between multi-slot PUSCH and the multi-slot PUCCH. Conversely, if the starting slot of the multi-slot PUCCH occurs earlier in time relative to the starting slot of the multi-slot PUSCH, UE 120 may select the second communication as the uplink communication to be transmitted, and may drop (or refrain from transmitting) the A-CSI report communication, in each overlapping slot between multi-slot PUSCH and the multi-slot PUCCH.

In some aspects, UE 120 may select the multi-slot PUSCH or the multi-slot PUCCH, and drop or refrain from transmitting the non-selected communication based at least in part on a priority hierarchy, such as the example priority hierarchy described above. In some examples, UE 120 may select the multi-slot PUSCH or the multi-slot PUCCH, and drop or refrain from transmitting the non-selected communication based at least in part on a priority hierarchy if UE 120 determines that the respective starting slots of the multi-slot PUSCH and the multi-slot PUCCH occur in the same slot (as illustrated in the multi-slot collision example illustrated in FIG. 5A). In some examples, UE 120 may select the multi-slot PUSCH or the multi-slot PUCCH, and drop or refrain from transmitting the non-selected communication based at least in part on a priority hierarchy without consideration of the starting slots of the multi-slot PUSCH and the multi-slot PUCCH.

In some aspects, if UE 120 determines that the respective priorities of the A-CSI report communication and the second communication are the same, UE 120 may determine that a scheduling error has occurred. Accordingly, UE 120 may resolve the collision between the A-CSI report communication and the second communication based at least in part on a UE-specific operation, which may be different for different UE and/or component part vendors.

As further shown in FIG. 5C, and by reference number 508, UE 120 may determine whether to transmit the uplink communication on the multi-slot PUSCH or the PUCCH in the slot. In some aspects, UE 120 may determine to transmit the uplink communication on the physical uplink channel on which the selected uplink communication was originally scheduled for transmission. As an example, if UE 120 selects the A-CSI report communication as the uplink communication for the slot (and drops and/or refrains from transmitting the second communication in the slot), UE 120 may determine to transmit the uplink communication on the multi-slot PUSCH in the slot. As another example, if UE 120 selects the second communication as the uplink communication for the slot (and drops and/or refrains from transmitting the A-CSI report communication in the slot), UE 120 may determine to transmit the uplink communication on the PUCCH in the slot.

In some aspects, if the second communication is an HARQ-Ack communication, UE 120 may determine whether to transmit the uplink communication on the multi-slot PUSCH or the PUCCH based at least in part on whether the PUCCH is a single slot PUCCH (and thus, the collision is a single-slot collision) or a multi-slot PUCCH (and thus, the collision is a multi-slot collision). For example, if UE 120 determines that the PUCCH is a multi-slot PUCCH (and thus, the collision is a multi-slot collision), UE 120 may determine to transmit the HARQ-Ack communication on the multi-slot PUCCH. As another example, if UE 120 determines that the PUCCH is a single-slot PUCCH (and thus, the collision is a single-slot collision), UE 120 may determine to transmit the HARQ-Ack communication on the multi-slot PUSCH in the overlapping slots. In some aspects, if UE 120 determines to transmit the HARQ-Ack communication on the multi-slot PUSCH in the overlapping slots, UE 120 may transmit the HARQ-Ack communication on a PUCCH in non-overlapping slots or may transmit an A-CSI on the multi-slot PUSCH in the non-overlapping slots.

In some aspects, UE 120 may determine to drop and/or refrain from transmitting on the non-selected physical uplink channel in the slot. As an example, if UE 120 determines to transmit the uplink communication on the multi-slot PUSCH in the slot, UE 120 may determine to drop and/or refrain from transmitting on the PUCCH in the slot. As another example, if UE 120 determines to transmit the uplink communication on the PUCCH in the slot, UE 120 may determine to drop and/or refrain from transmitting on the multi-slot PUSCH in the slot.

As further shown in FIG. 5C, and by reference number 510, UE 120 may transmit, to BS 110, the uplink communication in the slot on the determined physical uplink channel. In some aspects, UE 120 may drop and/or refrain from transmitting the non-selected communication in the slot. In some aspects, UE 120 may drop and/or refrain from transmitting the non-selected physical uplink channel (e.g., the non-selected multi-slot PUSCH or the non-selected PUCCH) in the slot. In some aspects, UE 120 may perform the techniques and/or actions, described above in connection with reference number 504-510, for each slot of the one or more slots in which the A-CSI report communication on a multi-slot PUSCH overlaps with the second communication on a PUCCH.

In this way, UE 120 is capable of resolving a collision between an A-CSI report communication that is scheduled to be transmitted with repetition on a multi-slot PUSCH and a second communication that is scheduled to be transmitted on a PUCCH (e.g., a single-slot PUCCH, a multi-slot PUCCH, and/or the like), which increases the reliability of the UE, increases the operability of the UE, increases the ability of UE 120 to resolve collisions, and/or the like.

As indicated above, FIGS. 5A-5C are provided as examples. Other examples may differ from what is described with respect to FIGS. 5A-5C.

FIG. 6 is a diagram illustrating an example process 600 performed, for example, by a UE, in accordance with various aspects of the present disclosure. Example process 600 is an example where a UE (e.g., UE 120) performs operations associated with collision handling for PUSCH repetition.

As shown in FIG. 6, in some aspects, process 600 may include identifying one or more slots in which an A-CSI report communication on a multi-slot PUSCH overlaps with a second communication on a PUCCH (block 610). For example, the UE (e.g., using receive processor 258, transmit processor 264, controller/processor 280, memory 282, and/or the like) may identify one or more slots in which an A-CSI report communication on a multi-slot PUSCH overlaps with a second communication on a PUCCH, as described above.

As further shown in FIG. 6, in some aspects, process 600 may include selecting, for a slot of the one or more slots, an uplink communication from the A-CSI report communication or the second communication based at least in part on a first priority assigned to the A-CSI report communication and a second priority assigned to the second communication (block 620). For example, the UE (e.g., using receive processor 258, transmit processor 264, controller/processor 280, memory 282, and/or the like) may select, for a slot of the one or more slots, an uplink communication from the A-CSI report communication or the second communication based at least in part on a first priority assigned to the A-CSI report communication and a second priority assigned to the second communication, as described above.

As further shown in FIG. 6, in some aspects, process 600 may include determining whether to transmit the uplink communication on the multi-slot PUSCH or the PUCCH in the slot (block 630). For example, the UE (e.g., using receive processor 258, transmit processor 264, controller/processor 280, memory 282, and/or the like) may determine whether to transmit the uplink communication on the multi-slot PUSCH or the PUCCH in the slot, as described above.

As further shown in FIG. 6, in some aspects, process 600 may include transmitting, in the slot, the uplink communication based at least in part on determining whether to transmit the uplink communication on the multi-slot PUSCH or the PUCCH in the slot (block 640). For example, the UE (e.g., using receive processor 258, transmit processor 264, controller/processor 280, memory 282, and/or the like) may transmit, in the slot, the uplink communication based at least in part on determining whether to transmit the uplink communication on the multi-slot PUSCH or the PUCCH in the slot, as described above.

Process 600 may include additional aspects, such as any single implementation or any combination of aspects described below and/or in connection with one or more other processes described elsewhere herein.

In a first aspect, the PUCCH comprises a single-slot PUCCH, or a multi-slot PUCCH. In a second aspect, alone or in combination with the first aspect, process 600 comprises receiving an uplink grant that schedules the A-CSI report communication on the multi-slot PUSCH in the one or more slots and determining, for the slot, whether an amount of time, between a time that the uplink grant was received and an earlier of a starting symbol of the A-CSI report communication or a starting symbol of the second communication, satisfies a timing threshold. In a third aspect, alone or in combination with one or more of the first or second aspects, selecting the uplink communication comprises selecting the uplink communication based at least in part on determining that the amount of time satisfies the timing threshold.

In a fourth aspect, alone or in combination with one or more of the first through third aspects, the second communication comprises an HARQ-Ack communication. In a fifth aspect, alone or in combination with one or more of the first through fourth aspects, selecting the uplink communication comprises determining, for the slot, whether an amount of time, between an ending symbol of a PDSCH communication associated with the HARQ-Ack communication and an earlier of a starting symbol of the A-CSI report communication and the HARQ-Ack communication, satisfies a timing threshold. In a sixth aspect, alone or in combination with one or more of the first through fifth aspects, selecting the uplink communication comprises selecting the uplink communication based at least in part on determining that the amount of time satisfies the timing threshold.

In a seventh aspect, alone or in combination with one or more of the first through sixth aspects, process 600 comprises receiving an uplink grant that schedules the A-CSI report communication on the multi-slot PUSCH in the one or more slots, determining, for the slot, whether an amount of time, between a time that the uplink grant was received and an earlier of a starting symbol of the A-CSI report communication or a starting symbol of the second communication satisfies a timing threshold, and determining that an error has occurred based at least in part on determining that the amount of time does not satisfy the timing threshold.

In an eighth aspect, alone or in combination with one or more of the first through seventh aspects, the second communication comprises a hybrid automatic repeat request acknowledgement (HARQ-Ack) communication. In a ninth aspect, alone or in combination with one or more of the first through eighth aspects, process 600 comprises determining, for the slot, whether an amount of time, between an ending symbol of a physical downlink shared channel (PDSCH) communication associated with the HARQ-Ack communication and an earlier of a starting symbol of the A-CSI report communication and the HARQ-Ack communication, satisfies a timing threshold, and determining that an error has occurred based at least in part on determining that the amount of time does not satisfy the timing threshold.

In a tenth aspect, alone or in combination with one or more of the first through ninth aspects, process 600 comprises identifying one or more other slots in which the A-CSI report communication on the multi-slot PUSCH does not overlap with the second communication on the PUCCH and transmitting, in each slot of the one or more other slots, the A-CSI report communication based at least in part on identifying the one or more other slots. In an eleventh aspect, alone or in combination with one or more of the first through tenth aspects, the PUCCH comprises a multi-slot PUCCH. In a twelfth aspect, alone or in combination with one or more of the first through eleventh aspects, process 600 comprises identifying one or more other slots in which the second communication on the multi-slot PUCCH does not overlap with the A-CSI report communication on the multi-slot PUSCH and transmitting, in each slot of the one or more other slots, the second communication based at least in part on identifying the one or more other slots.

In a thirteenth aspect, alone or in combination with one or more of the first through twelfth aspects, the PUCCH comprises a single-slot PUCCH. In a fourteenth aspect, alone or in combination with one or more of the first through thirteenth aspects, the second communication comprises an HARQ-Ack communication. In a fifteenth aspect, alone or in combination with one or more of the first through fourteenth aspects, the second priority is greater relative to the first priority. In a sixteenth aspect, alone or in combination with one or more of the first through fifteenth aspects, selecting the uplink communication comprises selecting the HARQ-Ack communication as the uplink communication based at least in part on the second priority being greater relative to the first priority. In a seventeenth aspect, alone or in combination with one or more of the first through sixteenth aspects, determining whether to transmit the uplink communication on the multi-slot PUSCH or the PUCCH in the slot comprises determining to transmit the HARQ-Ack communication on the multi-slot PUSCH based at least in part on selecting the HARQ-Ack communication as the uplink communication.

In an eighteenth aspect, alone or in combination with one or more of the first through seventeenth aspects, the second communication comprises a P-CSI report communication. In a nineteenth aspect, alone or in combination with one or more of the first through eighteenth aspects, the first priority is greater relative to the second priority. In a twentieth aspect, alone or in combination with one or more of the first through nineteenth aspects, selecting the uplink communication comprises selecting the A-CSI report communication based at least in part on the first priority being greater relative to the second priority. In a twenty-first aspect, alone or in combination with one or more of the first through twentieth aspects, determining whether to transmit the uplink communication on the multi-slot PUSCH or the PUCCH in the slot comprises determining to transmit the A-CSI report communication on the multi-slot PUSCH based at least in part on selecting the A-CSI report communication as the uplink communication.

In a twenty-second aspect, alone or in combination with one or more of the first through twenty-first aspects, the second communication comprises an SP-CSI report communication. In a twenty-third aspect, alone or in combination with one or more of the first through twenty-second aspects, the first priority is greater relative to the second priority. In a twenty-fourth aspect, alone or in combination with one or more of the first through twenty-third aspects, selecting the uplink communication comprises selecting the A-CSI report communication as the uplink communication based at least in part on the first priority being greater relative to the second priority. In a twenty-fifth aspect, alone or in combination with one or more of the first through twenty-fourth aspects, determining whether to transmit the uplink communication on the multi-slot PUSCH or the PUCCH in the slot comprises determining to transmit the A-CSI report communication on the multi-slot PUSCH based at least in part on selecting the A-CSI report communication as the uplink communication.

In a twenty-sixth aspect, alone or in combination with one or more of the first through twenty-fifth aspects, the second communication comprises an SR communication. In a twenty-seventh aspect, alone or in combination with one or more of the first through twenty-sixth aspects, the second priority is greater relative to the first priority. In a twenty-eighth aspect, alone or in combination with one or more of the first through twenty-seventh aspects, selecting the uplink communication comprises determining that no uplink data is to be transmitted on the multi-slot PUSCH in the one or more slots, selecting the SR communication as the uplink communication based at least in part on the second priority being greater relative to the first priority, and determining that no uplink data is to be transmitted on the multi-slot PUSCH in the one or more slots. In a twenty-ninth aspect, alone or in combination with one or more of the first through twenty-eighth aspects, determining whether to transmit the uplink communication on the multi-slot PUSCH or the PUCCH in the slot comprises determining to transmit the SR communication on the PUCCH based at least in part on selecting the SR communication as the uplink communication.

In a thirtieth aspect, alone or in combination with one or more of the first through twenty-ninth aspects, the second communication comprises SR communication. In a thirty-first aspect, alone or in combination with one or more of the first through thirtieth aspects, selecting the uplink communication comprises determining that uplink data is to be transmitted on the multi-slot PUSCH in the one or more slots and selecting the A-CSI report communication based at least in part on determining that the uplink data is to be transmitted on the multi-slot PUSCH in the one or more slots. In a thirty-second aspect, alone or in combination with one or more of the first through thirty-first aspects, determining whether to transmit the uplink communication on the multi-slot PUSCH or the PUCCH in the slot comprises determining to transmitting the A-CSI report communication on the multi-slot PUSCH based at least in part on selecting the A-CSI report communication as the uplink communication.

In a thirty-third aspect, alone or in combination with one or more of the first through thirty-second aspects, a sub-carrier spacing of the multi-slot PUSCH is greater relative to a sub-carrier spacing of the PUCCH. In a thirty-fourth aspect, alone or in combination with one or more of the first through thirty-third aspects, the one or more slots comprise a greater quantity of slots for the multi-slot PUSCH relative to the PUCCH. In a thirty-fifth aspect, alone or in combination with one or more of the first through thirty-fourth aspects, the PUCCH comprises a multi-slot PUCCH. In some aspects, selecting the uplink communication comprises selecting the uplink communication based at least in part on whether a starting slot for the A-CSI report communication occurs earlier in time relative to a starting slot for the second communication. In a thirty-sixth aspect, alone or in combination with one or more of the first through thirty-fifth aspects, the PUCCH comprises a multi-slot PUCCH. In some aspects, selecting the uplink communication comprises selecting the second communication as the uplink communication based at least in part on determining that a starting slot for the second communication occurs earlier in time relative to a starting slot for the A-CSI report communication.

In a thirty-seventh aspect, alone or in combination with one or more of the first through thirty-sixth aspects, the PUCCH comprises a multi-slot PUCCH. In some aspects, selecting the uplink communication comprises selecting the A-CSI report communication as the uplink communication based at least in part on determining that a starting slot for the A-CSI report communication occurs earlier in time relative to a starting slot for the second communication. In a thirty-eighth aspect, alone or in combination with one or more of the first through thirty-seventh aspects, the PUCCH comprises a multi-slot PUCCH. In a thirty-ninth aspect, alone or in combination with one or more of the first through thirty-eighth aspects, selecting the uplink communication comprises determining that an error has occurred based at least in part on determining that a starting slot for the second communication, and a starting slot for the A-CSI report communication, occur in a same slot and determining that the first priority and the second priority are a same priority.

In a fortieth aspect, alone or in combination with one or more of the first through thirty-ninth aspects, process 600 comprises dropping the A-CSI report communication in the slot based at least in part on selecting the second communication as the uplink communication or dropping the second communication in the slot based at least in part on selecting the A-CSI report communication as the uplink communication. In a forty-first aspect, alone or in combination with one or more of the first through fortieth aspects, process 600 comprises dropping the multi-slot PUSCH in the slot based at least in part on determining to transmit the uplink communication on the PUCCH in the slot or dropping the PUCCH in the slot based at least in part on determining to transmit the uplink communication on the multi-slot PUSCH in the slot.

In a forty-second aspect, alone or in combination with one or more of the first through forty-first aspects, the PUCCH comprises a multi-slot PUCCH, and a starting slot of the multi-slot PUSCH, and a starting slot of the multi-slot PUCCH, are a same slot. In a forty-third aspect, alone or in combination with one or more of the first through forty-second aspects, the second communication comprises an HARQ-Ack communication. In a forty-fourth aspect, alone or in combination with one or more of the first through forty-third aspects, the second priority is greater relative to the first priority. In a forty-fifth aspect, alone or in combination with one or more of the first through forty-fourth aspects, selecting the uplink communication comprises selecting the HARQ-Ack communication as the uplink communication based at least in part on the second priority being greater relative to the first priority.

In a forty-sixth aspect, alone or in combination with one or more of the first through forty-fifth aspects, determining whether to transmit the uplink communication on the multi-slot PUSCH or the PUCCH in the slot comprises determining to transmit the HARQ-Ack communication on the multi-slot PUSCH in the slot based at least in part on selecting the HARQ-Ack communication as the uplink communication. In a forty-seventh aspect, alone or in combination with one or more of the first through forty-sixth aspects, determining whether to transmit the uplink communication on the multi-slot PUSCH or the PUCCH in the slot comprises determining to transmit the A-CSI report communication on the multi-slot PUSCH, and transmitting the uplink communication comprises transmitting the A-CSI report communication on the multi-slot PUSCH based at least in part on determining to transmit the A-CSI report communication on the multi-slot PUSCH.

In a forty-eighth aspect, alone or in combination with one or more of the first through forty-seventh aspects, the second communication is a single-slot transmission or a multi-slot transmission, the second communication comprises a P-CSI report communication or a SP-CSI report communication, the first priority is greater relative to the second priority, selecting the uplink communication comprises selecting the A-CSI report communication based at least in part on the first priority being greater relative to the second priority, and determining whether to transmit the uplink communication on the multi-slot PUSCH or the PUCCH in the slot comprises determining to transmit the A-CSI report communication on the multi-slot PUSCH based at least in part on selecting the A-CSI report communication as the uplink communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying one or more first slots in which an aperiodic channel state information (A-CSI) report communication on a multi-slot physical uplink shared channel (PUSCH) with repetition overlaps with a second communication on a physical uplink control channel (PUCCH);
   selecting, for a slot of the one or more first slots, an uplink communication from the A-CSI report communication or the second communication based at least in part on a first priority assigned to the A-CSI report communication and a second priority assigned to the second communication;
   determining whether to transmit the uplink communication on the multi-slot PUSCH or the PUCCH in the slot;
   transmitting, in the slot, the uplink communication based at least in part on determining whether to transmit the uplink communication on the multi-slot PUSCH or the PUCCH in the slot;
   identifying one or more second slots in which the A-CSI report communication on the multi-slot PUSCH does not overlap with the second communication on the PUCCH; and
   transmitting, in the one or more second slots, the A-CSI report communication based at least in part on identifying the one or more second slots.

2. The method of claim 1, further comprising:
   receiving an uplink grant that schedules the A-CSI report communication on the multi-slot PUSCH in the one or more first slots; and
   determining, for the slot, whether an amount of time, between a time that the uplink grant was received and an earlier of a starting symbol of the A-CSI report communication or a starting symbol of the second communication, satisfies a timing threshold,
      wherein selecting the uplink communication comprises:
         selecting the uplink communication based at least in part on determining that the amount of time satisfies the timing threshold.

3. The method of claim 1, wherein the second communication comprises:
   a hybrid automatic repeat request acknowledgement (HARQ-Ack) communication;
   wherein the method further comprises:
      determining, for the slot, whether an amount of time, between an ending symbol of a physical downlink shared channel (PDSCH) communication associated with the HARQ-Ack communication and an earlier of a starting symbol of the A-CSI report communication and the HARQ-Ack communication, satisfies a timing threshold; and
   wherein selecting the uplink communication comprises:
      selecting the uplink communication based at least in part on determining that the amount of time satisfies the timing threshold.

4. The method of claim 1, further comprising:
   receiving an uplink grant that schedules the A-CSI report communication on the multi-slot PUSCH in the one or more first slots;
   determining, for the slot, whether an amount of time, between a time that the uplink grant was received and an earlier of a starting symbol of the A-CSI report communication or a starting symbol of the second communication satisfies a timing threshold; and
   determining that an error has occurred based at least in part on determining that the amount of time does not satisfy the timing threshold.

5. The method of claim 1, wherein the second communication comprises:
   a hybrid automatic repeat request acknowledgement (HARQ-Ack) communication; and
   wherein the method further comprises:
      determining, for the slot, whether an amount of time, between an ending symbol of a physical downlink shared channel (PDSCH) communication associated with the HARQ-Ack communication and an earlier of a starting symbol of the A-CSI report communication and the HARQ-Ack communication, satisfies a timing threshold; and
      determining that an error has occurred based at least in part on determining that the amount of time does not satisfy the timing threshold.

6. The method of claim 1, wherein transmitting the A-CSI report communication comprises:
   transmitting, in each slot of the one or more second slots, the A-CSI report communication.

7. The method of claim 1, wherein the PUCCH comprises:
   a multi-slot PUCCH; and
   wherein the method further comprises:
      identifying one or more third slots in which the second communication on the multi-slot PUCCH does not overlap with the A-CSI report communication on the multi-slot PUSCH; and
      transmitting, in the one or more third slots, the second communication based at least in part on identifying the one or more third slots.

8. The method of claim 1, wherein the PUCCH comprises:
   a single-slot PUCCH;
   wherein the second communication comprises:
      a hybrid automatic repeat request acknowledgement (HARQ-Ack) communication;
   wherein the second priority is greater relative to the first priority; and
   wherein selecting the uplink communication comprises:
      selecting the HARQ-Ack communication as the uplink communication based at least in part on the second priority being greater relative to the first priority.

9. The method of claim 8, wherein determining whether to transmit the uplink communication on the multi-slot PUSCH or the PUCCH in the slot comprises:
   determining to transmit the HARQ-Ack communication on the multi-slot PUSCH in the slot based at least in part on selecting the HARQ-Ack communication as the uplink communication.

10. The method of claim 1, wherein the second communication is a single-slot transmission or a multi-slot transmission;
wherein the second communication comprises:
a periodic channel state information (P-CSI) report communication or a semi-persistent channel state information (SP-CSI) report communication;
wherein the first priority is greater relative to the second priority;
wherein selecting the uplink communication comprises:
selecting the A-CSI report communication based at least in part on the first priority being greater relative to the second priority; and
wherein determining whether to transmit the uplink communication on the multi-slot PUSCH or the PUCCH in the slot comprises:
determining to transmit the A-CSI report communication on the multi-slot PUSCH based at least in part on selecting the A-CSI report communication as the uplink communication.

11. The method of claim 1, wherein determining whether to transmit the uplink communication on the multi-slot PUSCH or the PUCCH in the slot comprises:
determining to transmit the A-CSI report communication on the multi-slot PUSCH; and
wherein transmitting the uplink communication comprises:
transmitting the A-CSI report communication on the multi-slot PUSCH based at least in part on determining to transmit the A-CSI report communication on the multi-slot PUSCH.

12. The method of claim 1, wherein the second communication comprises:
a scheduling request (SR) communication;
wherein the second priority is greater relative to the first priority; and
wherein selecting the uplink communication comprises:
determining that no uplink data is to be transmitted on the multi-slot PUSCH in the one or more first slots; and
selecting the SR communication as the uplink communication based at least in part on:
the second priority being greater relative to the first priority, and
determining that no uplink data is to be transmitted on the multi-slot PUSCH in the one or more first slots.

13. The method of claim 12, wherein determining whether to transmit the uplink communication on the multi-slot PUSCH or the PUCCH in the slot comprises:
determining to transmit the SR communication on the PUCCH based at least in part on selecting the SR communication as the uplink communication.

14. The method of claim 1, wherein the second communication comprises:
a scheduling request (SR) communication; and
wherein selecting the uplink communication comprises:
determining that uplink data is to be transmitted on the multi-slot PUSCH in the one or more first slots; and
selecting the A-CSI report communication based at least in part on determining that the uplink data is to be transmitted on the multi-slot PUSCH in the one or more first slots.

15. The method of claim 14, wherein determining whether to transmit the uplink communication on the multi-slot PUSCH or the PUCCH in the slot comprises:
determining to transmitting the A-CSI report communication on the multi-slot PUSCH based at least in part on selecting the A-CSI report communication as the uplink communication.

16. The method of claim 1, wherein a sub-carrier spacing of the multi-slot PUSCH is greater relative to a sub-carrier spacing of the PUCCH; and
wherein the one or more first slots comprise:
a greater quantity of slots for the multi-slot PUSCH relative to the PUCCH.

17. The method of claim 1, wherein the PUCCH comprises:
a multi-slot PUCCH; and
wherein selecting the uplink communication comprises:
selecting the uplink communication based at least in part on whether a starting slot for the A-CSI report communication occurs earlier in time relative to a starting slot for the second communication.

18. The method of claim 1, wherein the PUCCH comprises:
a multi-slot PUCCH; and
wherein selecting the uplink communication comprises:
selecting the second communication as the uplink communication based at least in part on determining that a starting slot for the second communication occurs earlier in time relative to a starting slot for the A-CSI report communication.

19. The method of claim 1, wherein the PUCCH comprises:
a multi-slot PUCCH; and
wherein selecting the uplink communication comprises:
selecting the A-CSI report communication as the uplink communication based at least in part on determining that a starting slot for the A-CSI report communication occurs earlier in time relative to a starting slot for the second communication.

20. The method of claim 1, wherein the PUCCH comprises:
a multi-slot PUCCH; and
wherein selecting the uplink communication comprises:
determining that an error has occurred based at least in part on:
determining that a starting slot for the second communication, and a starting slot for the A-CSI report communication, occur in a same slot; and
determining that the first priority and the second priority are a same priority.

21. The method of claim 1, further comprising:
dropping the A-CSI report communication in the slot based at least in part on selecting the second communication as the uplink communication, or
dropping the second communication in the slot based at least in part on selecting the A-CSI report communication as the uplink communication.

22. The method of claim 1, further comprising:
dropping the multi-slot PUSCH in the slot based at least in part on determining to transmit the uplink communication on the PUCCH in the slot, or
dropping the PUCCH in the slot based at least in part on determining to transmit the uplink communication on the multi-slot PUSCH in the slot.

23. The method of claim 1, wherein the PUCCH comprises:
a multi-slot PUCCH;
wherein the second communication comprises:
a hybrid automatic repeat request acknowledgement (HARQ-Ack) communication;

wherein the second priority is greater relative to the first priority; and wherein selecting the uplink communication comprises:
selecting the HARQ-Ack communication as the uplink communication based at least in part on the second priority being greater relative to the first priority.

24. The method of claim 23, wherein determining whether to transmit the uplink communication on the multi-slot PUSCH or the PUCCH in the slot comprises:
determining to transmit the HARQ-Ack communication on the multi-slot PUCCH in the slot based at least in part on selecting the HARQ-Ack communication as the uplink communication.

25. A user equipment (UE) for wireless communication, comprising:
a memory; and
one or more processors coupled to the memory, the one or more processors configured to:
identify one or more first slots in which an aperiodic channel state information (A-CSI) report communication on a multi-slot physical uplink shared channel (PUSCH) with repetition overlaps with a second communication on a physical uplink control channel (PUCCH);
select, for a slot of the one or more first slots, an uplink communication from the A-CSI report communication or the second communication based at least in part on a first priority assigned to the A-CSI report communication and a second priority assigned to the second communication;
determine whether to transmit the uplink communication on the multi-slot PUSCH or the PUCCH in the slot;
transmit, in the slot, the uplink communication based at least in part on determining whether to transmit the uplink communication on the multi-slot PUSCH or the PUCCH in the slot;
identify one or more second slots in which the A-CSI report communication on the multi-slot PUSCH does not overlap with the second communication on the PUCCH; and
transmit, in the one or more second slots, the A-CSI report communication based at least in part on identifying the one or more second slots.

26. The UE of claim 25, wherein the one or more processors are further configured to:
receive an uplink grant that schedules the A-CSI report communication on the multi-slot PUSCH in the one or more first slots; and
determine, for the slot, whether an amount of time, between a time that the uplink grant was received and an earlier of a starting symbol of the A-CSI report communication or a starting symbol of the second communication, satisfies a timing threshold,
wherein the one or more processors, when selecting the uplink communication, are to:
select the uplink communication based at least in part on determining that the amount of time satisfies the timing threshold.

27. A non-transitory computer-readable medium storing one or more instructions for wireless communication, the one or more instructions comprising:
one or more instructions that, when executed by one or more processors of a user equipment (UE), cause the UE to:
identify one or more first slots in which an aperiodic channel state information (A-CSI) report communication on a multi-slot physical uplink shared channel (PUSCH) with repetition overlaps with a second communication on a physical uplink control channel (PUCCH);
select, for a slot of the one or more first slots, an uplink communication from the A-CSI report communication or the second communication based at least in part on a first priority assigned to the A-CSI report communication and a second priority assigned to the second communication;
determine whether to transmit the uplink communication on the multi-slot PUSCH or the PUCCH in the slot;
transmit, in the slot, the uplink communication based at least in part on determining whether to transmit the uplink communication on the multi-slot PUSCH or the PUCCH in the slot;
identify one or more second slots in which the A-CSI report communication on the multi-slot PUSCH does not overlap with the second communication on the PUCCH; and
transmit, in the one or more second slots, the A-CSI report communication based at least in part on identifying the one or more second slots.

28. The non-transitory computer-readable medium of claim 27, wherein the second communication comprises:
a hybrid automatic repeat request acknowledgement (HARQ-Ack) communication;
wherein the one or more instructions, when executed by the one or more processors, further cause the UE to:
determine, for the slot, whether an amount of time, between an ending symbol of a physical downlink shared channel (PDSCH) communication associated with the HARQ-Ack communication and an earlier of a starting symbol of the A-CSI report communication and the HARQ-Ack communication, satisfies a timing threshold; and
wherein the one or more instructions, that cause the UE to select the uplink communication, cause the UE to:
select the uplink communication based at least in part on determining that the amount of time satisfies the timing threshold.

29. An apparatus for wireless communication, comprising:
means for identifying one or more first slots in which an aperiodic channel state information (A-CSI) report communication on a multi-slot physical uplink shared channel (PUSCH) with repetition overlaps with a second communication on a physical uplink control channel (PUCCH);
means for selecting, for a slot of the one or more first slots, an uplink communication from the A-CSI report communication or the second communication based at least in part on a first priority assigned to the A-CSI report communication and a second priority assigned to the second communication;
means for determining whether to transmit the uplink communication on the multi-slot PUSCH or the PUCCH in the slot;
means for transmitting, in the slot, the uplink communication based at least in part on determining whether to transmit the uplink communication on the multi-slot PUSCH or the PUCCH in the slot;
means for identifying one or more second slots in which the A-CSI report communication on the multi-slot PUSCH does not overlap with the second communication on the PUCCH; and means for transmitting, in the one or more second slots, the A-CSI report communication based at least in part on identifying the one or more second slots.

30. The apparatus of claim 29, further comprising:
means for receiving an uplink grant that schedules the A-CSI report communication on the multi-slot PUSCH in the one or more first slots;
means for determining, for the slot, whether an amount of time, between a time that the uplink grant was received and an earlier of a starting symbol of the A-CSI report communication or a starting symbol of the second communication satisfies a timing threshold; and
means for determining that an error has occurred based at least in part on determining that the amount of time does not satisfy the timing threshold.

* * * * *